(12) United States Patent
Yamaguchi

(10) Patent No.: US 6,959,088 B1
(45) Date of Patent: Oct. 25, 2005

(54) DATA PROCESSING APPARATUS AND METHOD FOR ENCRYPTION OR DECRYPTION OF COMMUNICATION DATA

(75) Inventor: Masahiko Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,691

(22) Filed: Mar. 17, 2000

(30) Foreign Application Priority Data

Mar. 19, 1999 (JP) .................................. 11-076758

(51) Int. Cl.7 ............................................. H04L 9/00
(52) U.S. Cl. ...................... 380/217; 713/176; 380/217; 380/258; 380/54; 382/192; 382/209; 382/232
(58) Field of Search ................................ 380/217, 258, 380/54; 713/176; 382/209, 232, 192

(56) References Cited

U.S. PATENT DOCUMENTS

| | | | | |
|---|---|---|---|---|
| 5,412,730 A | * | 5/1995 | Jones | ........................ 380/46 |
| 5,764,770 A | * | 6/1998 | Schipper et al. | ............ 713/176 |
| 5,805,700 A | * | 9/1998 | Nardone et al. | ............ 380/217 |
| 6,314,188 B1 | * | 11/2001 | Ishibashi | ..................... 380/201 |

* cited by examiner

Primary Examiner—Ayaz Sheikh
Assistant Examiner—Taghi T. Arani
(74) Attorney, Agent, or Firm—Fitzpatrick, Cella, Harper & Scinto

(57) ABSTRACT

In order to shorten the time required for encryption and decryption of communication data, the contents of input data are analyzed by a discrimination method such as pattern matching, and in accordance with this analysis result, it is checked whether the received data is particular data. A portion of data judged as the particular data is encrypted and sent to an output buffer, whereas a portion other than the particular portion is not encrypted but is directly sent to the output buffer. Thereafter, the contents in the output buffer are transmitted. The particular data includes a control code of print data, upper bits of image data, predetermined discrete bits of voice data, a conversion tale for compression data, and the like.

6 Claims, 12 Drawing Sheets

IMAGE DATA

DATA PROCESSING APPARATUS AND METHOD FOR ENCRYPTION OR DECRYPTION OF COMMUNICATION DATA

BACKGROUND OF THE INVENTION

1. Field of the Invention

The present invention relates to a data processing apparatus and method for encryption or decryption of communication data.

2. Related Background Art

It is necessary for an information apparatus connected to a network to prevent data sniffing and wiretapping by third parties. In order to prevent such illegal acts, data ciphering is very effective.

As a cryptosystem becomes more complicated, it takes a longer time to perform a cipher process. For example, in transmitting print data encrypted at a personal computer via a network and printing decrypted data with a printer, the total printing speed is lowered because of encryption and decryption processes.

SUMMARY OF THE INVENTION

It is an object of the invention to solve the above problem and provide a data processing apparatus and method capable of shortening a time required for encryption and decryption while the data security is retained.

According to one aspect, the present invention which achieves these objectives relates to a data processing apparatus comprising: input means for inputting data to be transmitted; extracting means for extracting a particular portion of the data input from the input means; encrypting means for encrypting the particular portion extracted by the extracting means; and transmitting means for transmitting the particular portion encrypted by said encrypting means and a remaining portion not extracted by the extracting means.

According to another aspect, the present invention which achieves these objectives relates to a data processing apparatus comprising: receiving means for receiving data; extracting means for extracting an encrypted portion from data received by the receiving means; analyzing means for analyzing the extracted portion extracted by the extracting means; and output means for outputting the portion analyzed by the analyzing means and a remaining portion not extracted by the extracting means.

According to still another aspect, the present invention which achieves these objectives relates to a data processing method comprising: an input step of inputting data to be transmitted; an extracting step of extracting a particular portion of the data input at the input step; an encrypting step of encrypting the particular portion extracted at the extracting step: and a transmitting step of transmitting the particular portion encrypted at the encrypting step and a remaining portion not extracted at the extracting step.

According to yet another aspect, the present invention which achieves these objectives relates to a data processing method comprising: a receiving step of receiving data; an extracting step of extracting an encrypted portion from data received at the receiving step; an analyzing step of analyzing the extracted portion extracted at the extracting step; and an output step of outputting the portion analyzed at the analyzing step and a remaining portion not extracted at the extracting step.

According to another aspect, the present invention which achieves these objectives relates to a computer readable storage medium storing a data processing program for controlling a computer to perform data processing, said program comprising codes for causing the computer to perform: an input step of inputting data to be transmitted; an extracting step of extracting a particular portion of the data input at the input step; an encrypting step of encrypting the particular portion extracted at the extracting step: and a transmitting step of transmitting the particular portion encrypted at the encrypting step and a remaining portion not extracted at the extracting step.

According to another aspect, the present invention which achieves these objectives relates to a computer readable storage medium storing a data processing program for controlling a computer to perform data processing, said program comprising codes for causing the computer to perform: a receiving step of receiving data; an extracting step of extracting an encrypted portion from data received at the receiving step; an analyzing step of analyzing the extracted portion extracted at the extracting step; and an output step of outputting the portion analyzed at the analyzing step and a remaining portion not extracted at the extracting step.

Other objectives and advantages besides those discussed above shall be apparent to those skilled in the art from the description of preferred embodiments of the invention which follows. In the description, reference is made to accompanying drawings, which form a part of the invention, and which illustrates an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

First Embodiment

Figure 1:
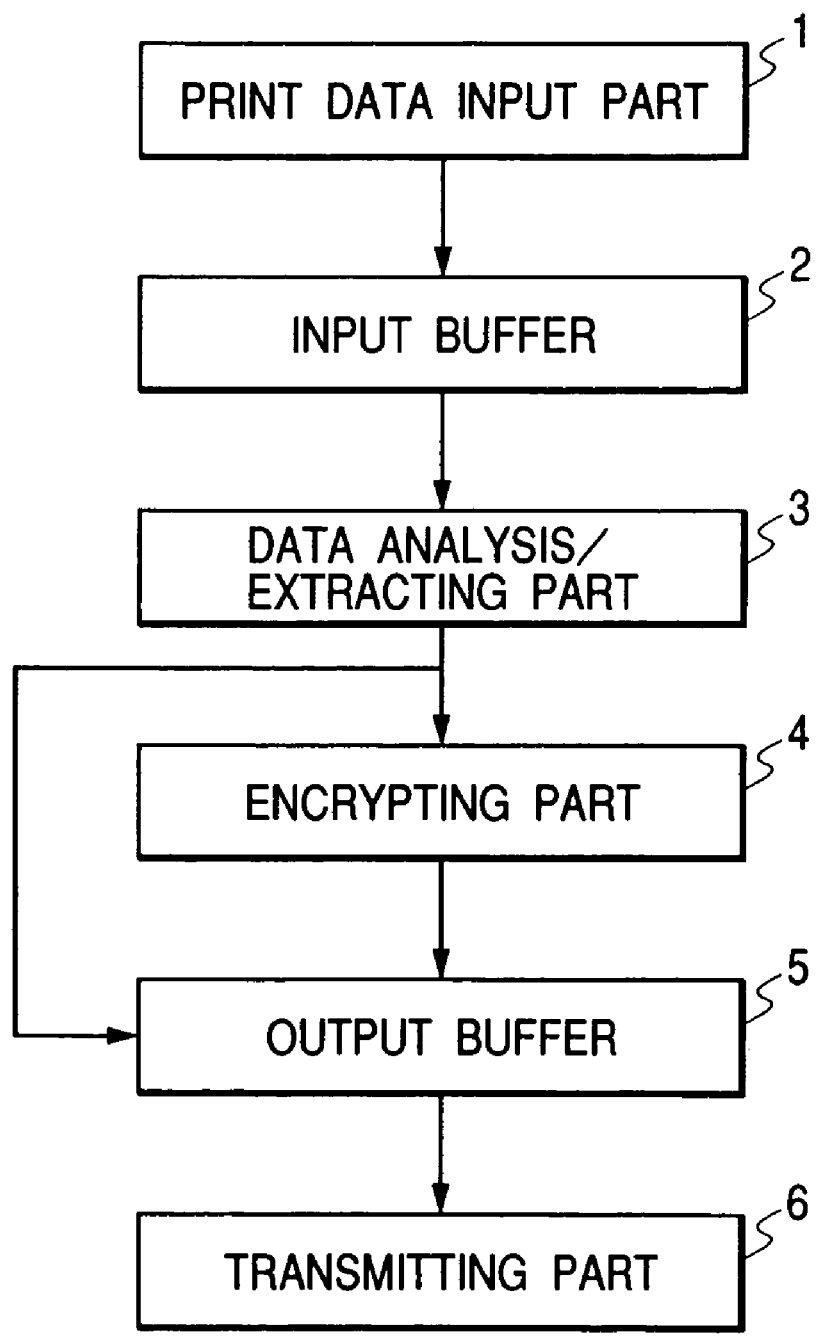
FIG. 1 is a block diagram illustrating a first embodiment of the invention.
Figure 3:
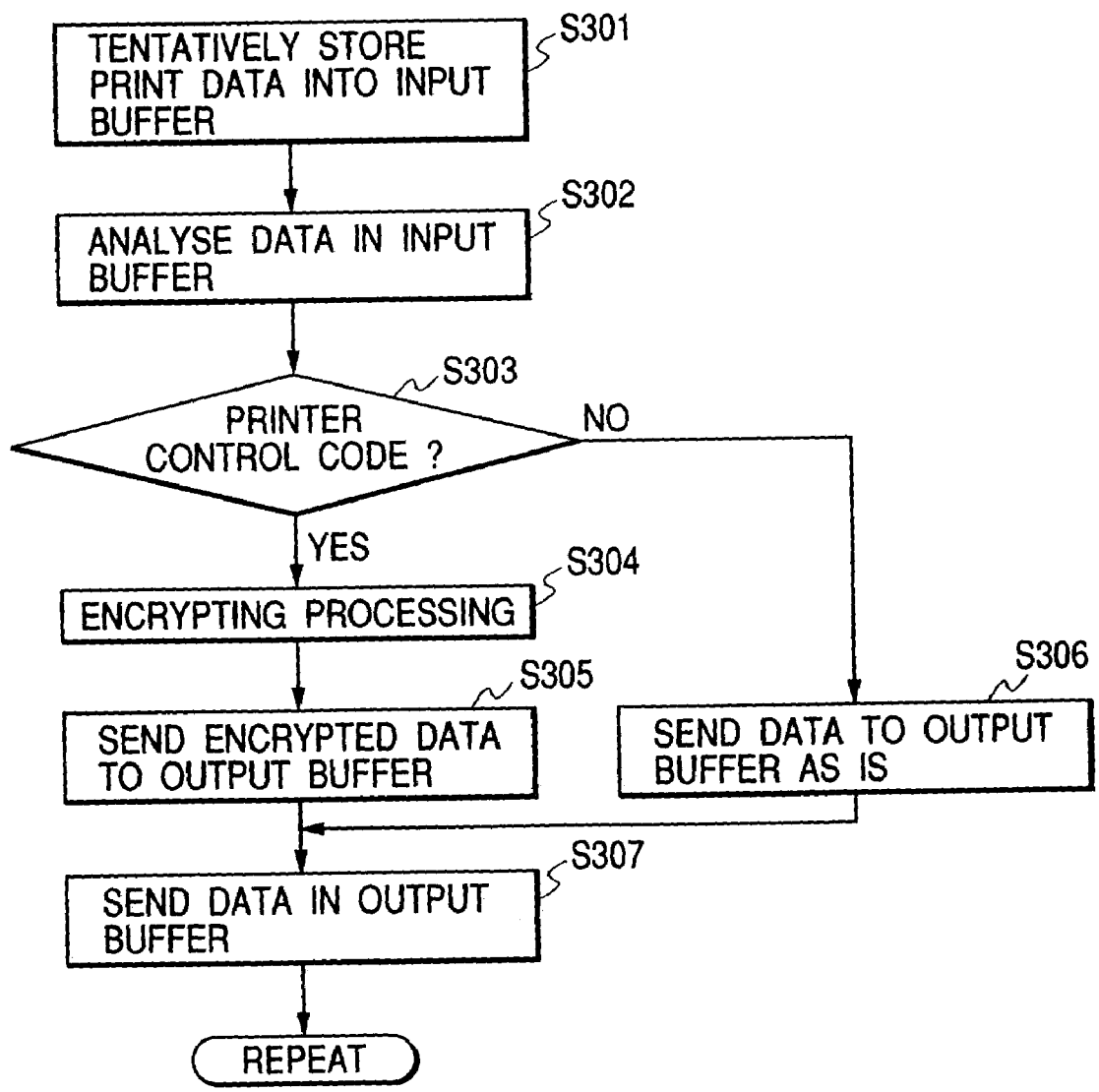
FIG. 3 is a flow chart illustrating an example of the operation on an encryption side.

FIGS. 1 and 3 illustrate the first embodiment of the invention. In this embodiment, encryption of print data to be transmitted from a printer will be described. In this example, of print data, only control codes which determine the fundamental operation of a printer are encrypted. The control codes are important codes which determine the analysis method of data which follows the preceding control code. If the control codes are encrypted, the analysis method for following data can be kept in secret, and sufficient cipher security can be expected even if all print data is not encrypted.

With reference to FIG. 1, the structure of an encryption apparatus will be described. In FIG. 1, reference numeral 1 represents a print data input part for inputting print data. Reference numeral 2 represents an input buffer for tentatively storing print data. Reference numeral 3 represents a data analysis/extracting part for analyzing the contents of print data stored in the input buffer 2 and extracting control codes to be encrypted. Reference numeral 4 represents an encrypting part for encrypting the control codes extracted by the data analysis/extracting part 3. Reference numeral 5 represents an output buffer for tentatively storing encrypted data and remaining data not encrypted, as the data to be transmitted. Reference numeral 6 represents a transmitting part for transmitting data in the output buffer 5.

Figure 2:
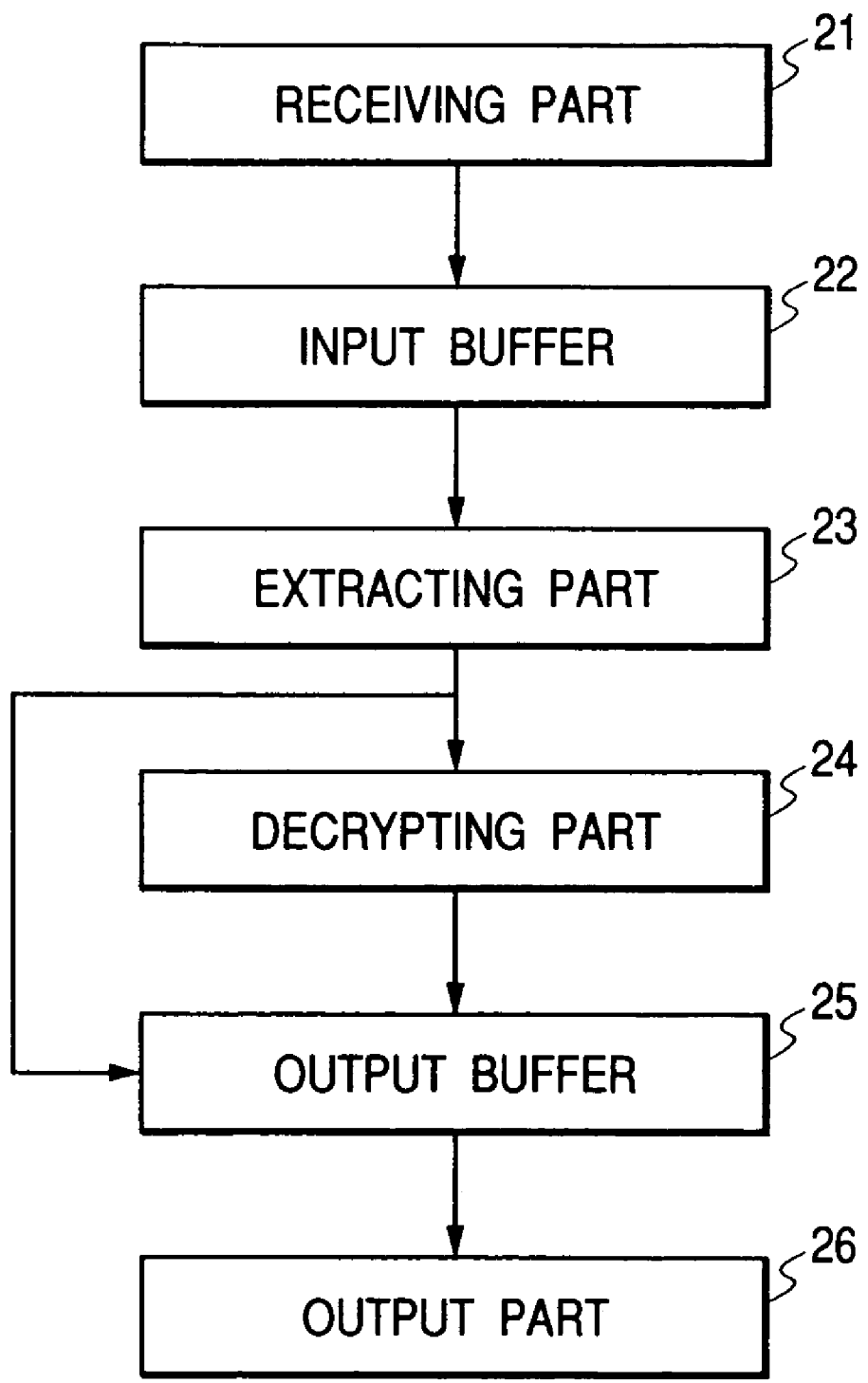
FIG. 2 is a block diagram illustrating the first embodiment of the invention.

With reference to FIG. 2, the structure on a decryption side will be described. In FIG. 2, reference numeral 21 represents a receiving part for receiving encrypted communication data. Reference numeral 22 represents an input buffer for tentatively storing received data to be decrypted. Reference numeral 23 represents an extracting part for discriminating and extracting encrypted data in the data stored in the input buffer 22. Reference numeral 24 represents a decrypting part for decrypting the data extracted by the extracting part 23. Reference numeral 25 represents an output buffer for tentatively storing data to be printed. Reference numeral 26 represents an output part for outputting data stored in the output buffer 25.

FIG. 3 is a flow chart illustrating an example of the operation to be executed on the encryption side. Print data input from the print data input part 1 is tentatively stored in the input buffer (S301), and the contents of the data are analyzed by the data analysis/extracting part 3 by a discrimination method such as pattern matching (S302). In accordance with the data analysis result, it is checked whether or not the data is the printer control code (S303). A part of the data recognized as the printer control code by the data analysis/extracting part 3 is encrypted by the encrypting part 4 (S304) and sent to the output buffer 5 (S305). Data except the printer control code is not subjected to the encryption process but is directly sent to the output buffer 5 in which it is synthesized with the encrypted control codes (S306). Thereafter, the contents in the output buffer 5 are transmitted from the transmitting part 6 (S307).

Figure 4:
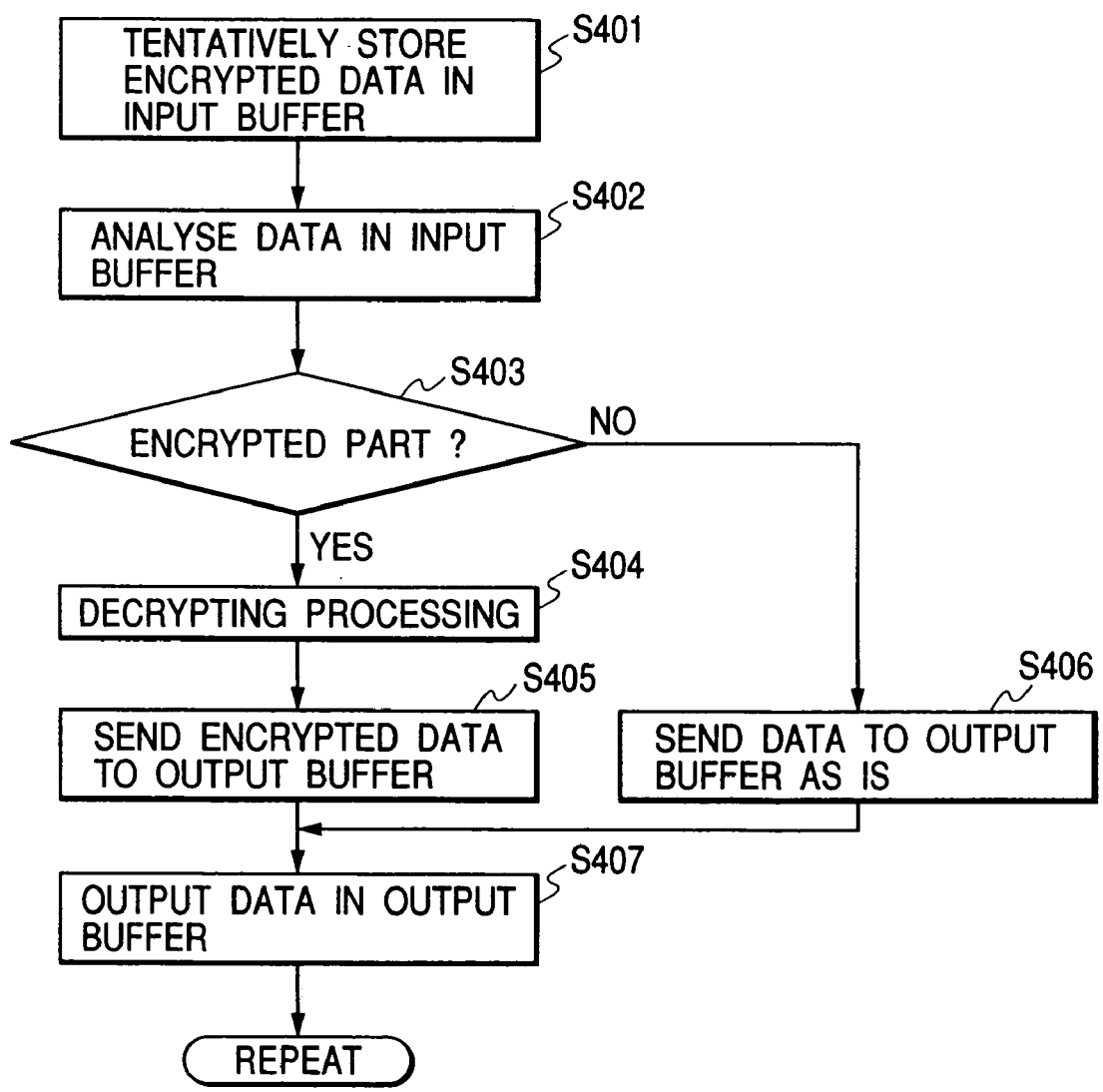
FIG. 4 is a flow chart illustrating an example of the operation on a decryption side.

FIG. 4 is a flow chart illustrating an example of the operation on the decryption side. Encrypted data and not encrypted data received by the receiving part 21 are tentatively stored in the input buffer 22 (S401), the contents of the encrypted data in the input buffer 22 are analyzed (S402), and in accordance with the data analysis result, the extracting part 23 discriminates between the encrypted data and the data not encrypted (S403). The encrypted data is extracted by the extracting part 23, decrypted by the decrypting part 24 by a decrypting process (S404) and output to the output buffer (S405). The data not encrypted is directly sent to the output buffer 25 in which it is synthesized with the decrypted control codes without performing decrypting process (S406). Thereafter, the contents in the output buffer 25 are output from the output part 26 to a printer or the like which analyzes the print codes and prints the print data.

In this embodiment, not all the communication data is encrypted, but only the important portion thereof is encrypted. It is therefore possible to shorten the time required for ciphering communication data.

Second Embodiment

Figure 5:
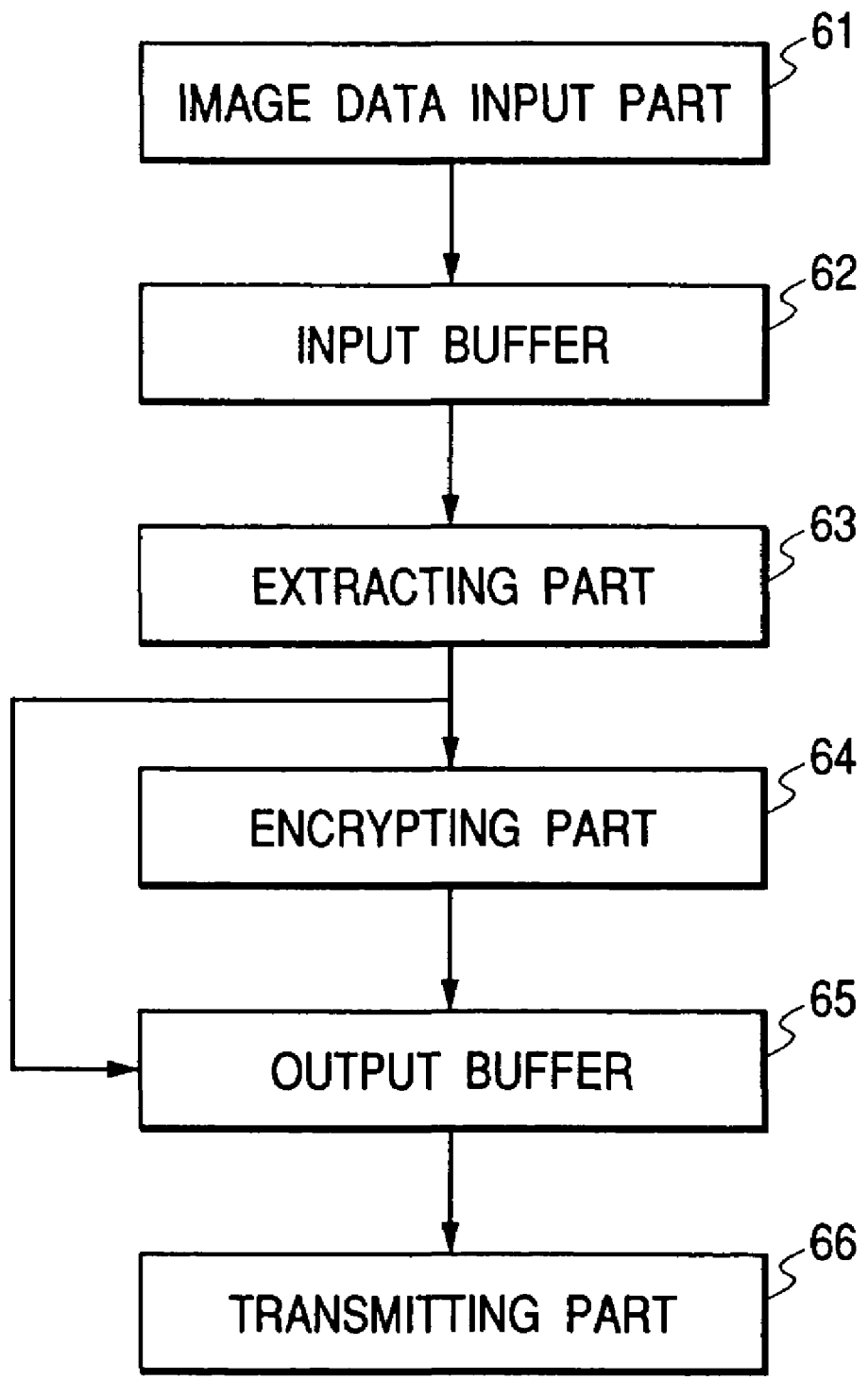
FIG. 5 is a block diagram illustrating a second embodiment of the invention.

FIG. 5 illustrates the second embodiment of the invention. In this example, image data is encrypted. Only those image data having a high weight portion of image information representation is encrypted. It is assumed that each pixel of image data is represented by R, G and B primary three colors each having eight bits, totalling in 24 bits per pixel.

In FIG. 5, reference numeral 61 represents an image data input part for inputting image data. Reference numeral 62 represents an input buffer for tentatively storing image data. Reference numeral 63 represents a data extracting part for extracting upper four bits of each R, G and B data stored in the input buffer 62. Reference numeral 64 represents an encrypting part for encrypting the data extracted by the data extracting part 63. Reference numeral 65 represents an output buffer for tentatively storing data to be transmitted. Reference numeral 66 represents a transmitting part for transmitting data in the output buffer 65.

Figure 6:
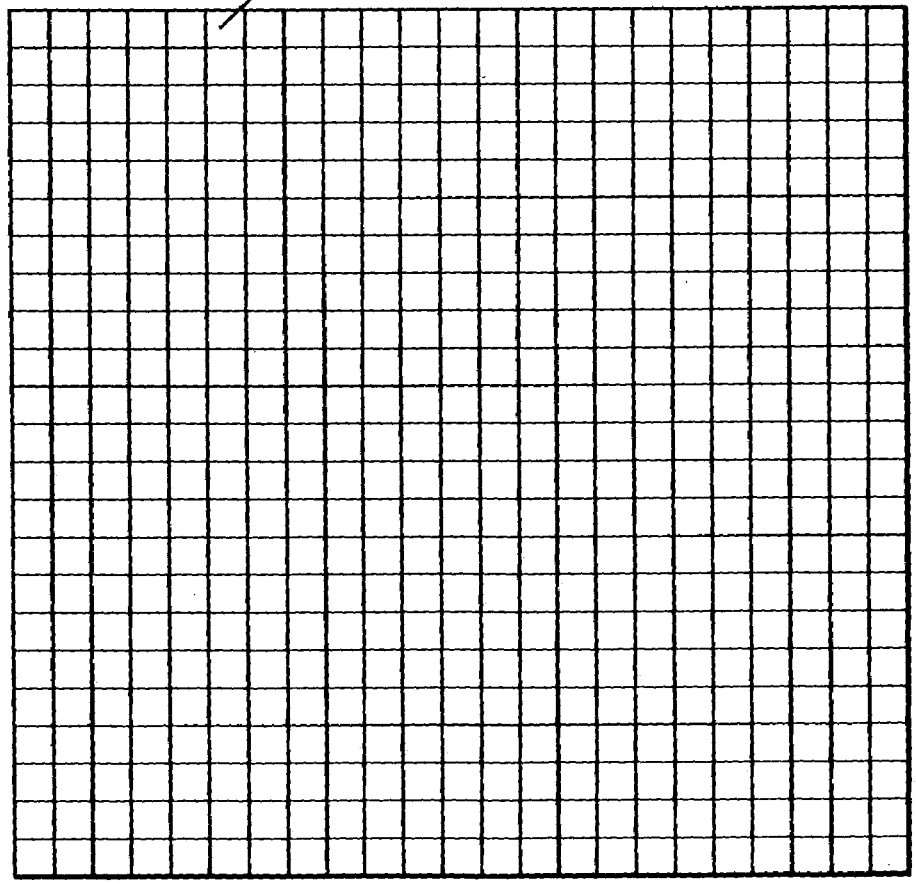
FIG. 6 is a diagram illustrating the structure of image data according to the second embodiment of the invention.

Next, the structure of image data will be described with reference to FIG. 6. As described above, each pixel of image data is represented by R, G and B primary three colors each having eight bits, totalling in 24 bits per pixel. Image data having a high weight portion of image information representation is upper bits. For example, if the upper four bits of eight bits of each R, G and B data are lost, it is almost impossible to recover the original correct image data. Therefore, if the upper four bits only are encrypted, the distinctive ciphering effects can be expected even if all the image data is not encrypted.

Figure 7:
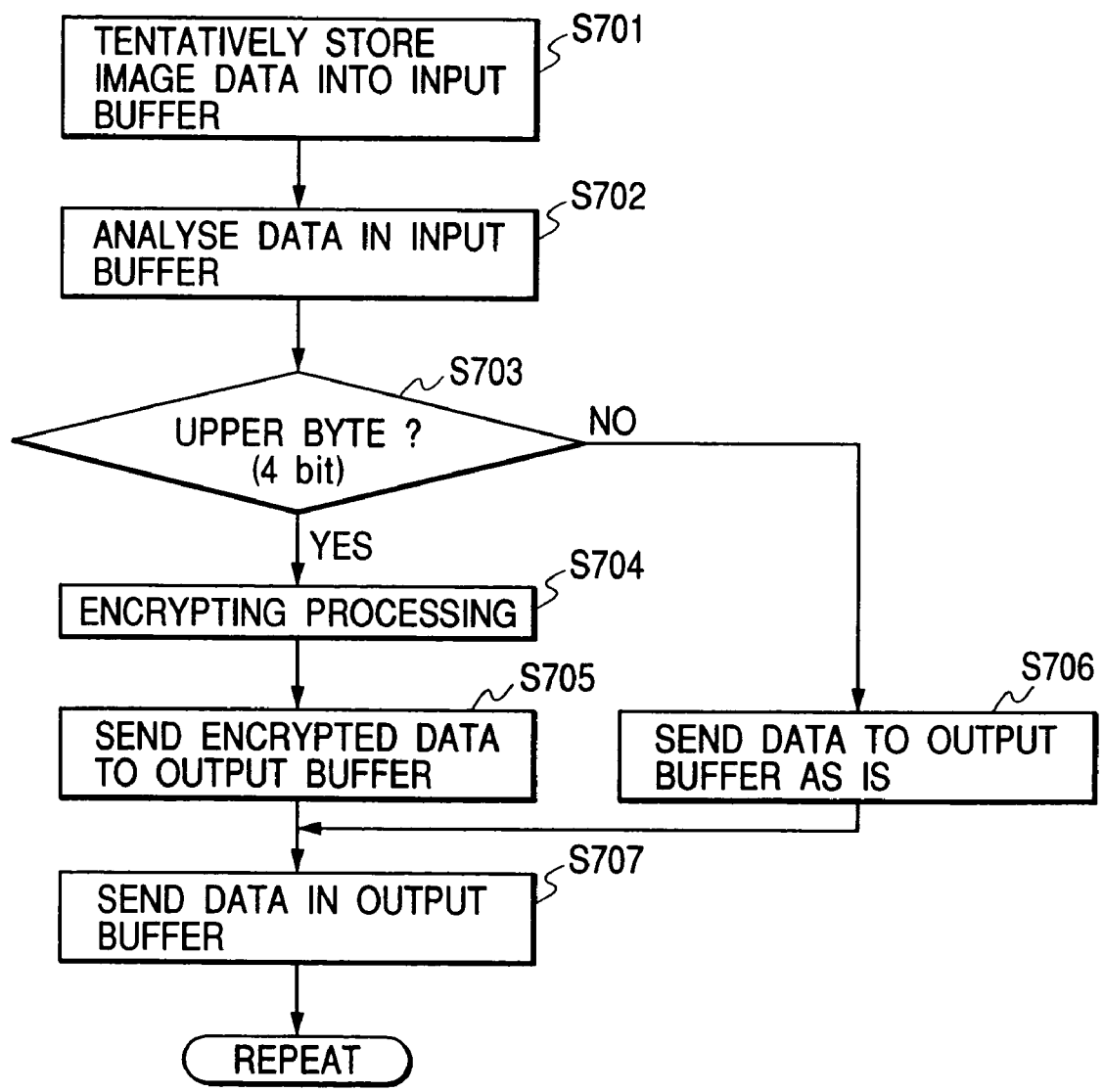
FIG. 7 is a flow chart illustrating an example of the operation according to the second embodiment of the invention.

FIG. 7 is a flow chart illustrating an example of the operation according to this embodiment. Image data input from the image data input part 61 is tentatively stored in the input buffer 62 (S701), and thereafter analyzed by the extracting part 63 (S702). Only the upper four bits of each of R, G and B three colors are extracted by the extracting part (S703), the upper four bits are encrypted by the encrypting part 64 (S704) and sent to the output buffer 65 (S705). The remaining data of lower four bits is not encrypted, but is directly sent to the output buffer 65 (S706). Thereafter, the contents in the output buffer 65 are transmitted from the transmitting part 66 (S707).

Third Embodiment

Figure 8:
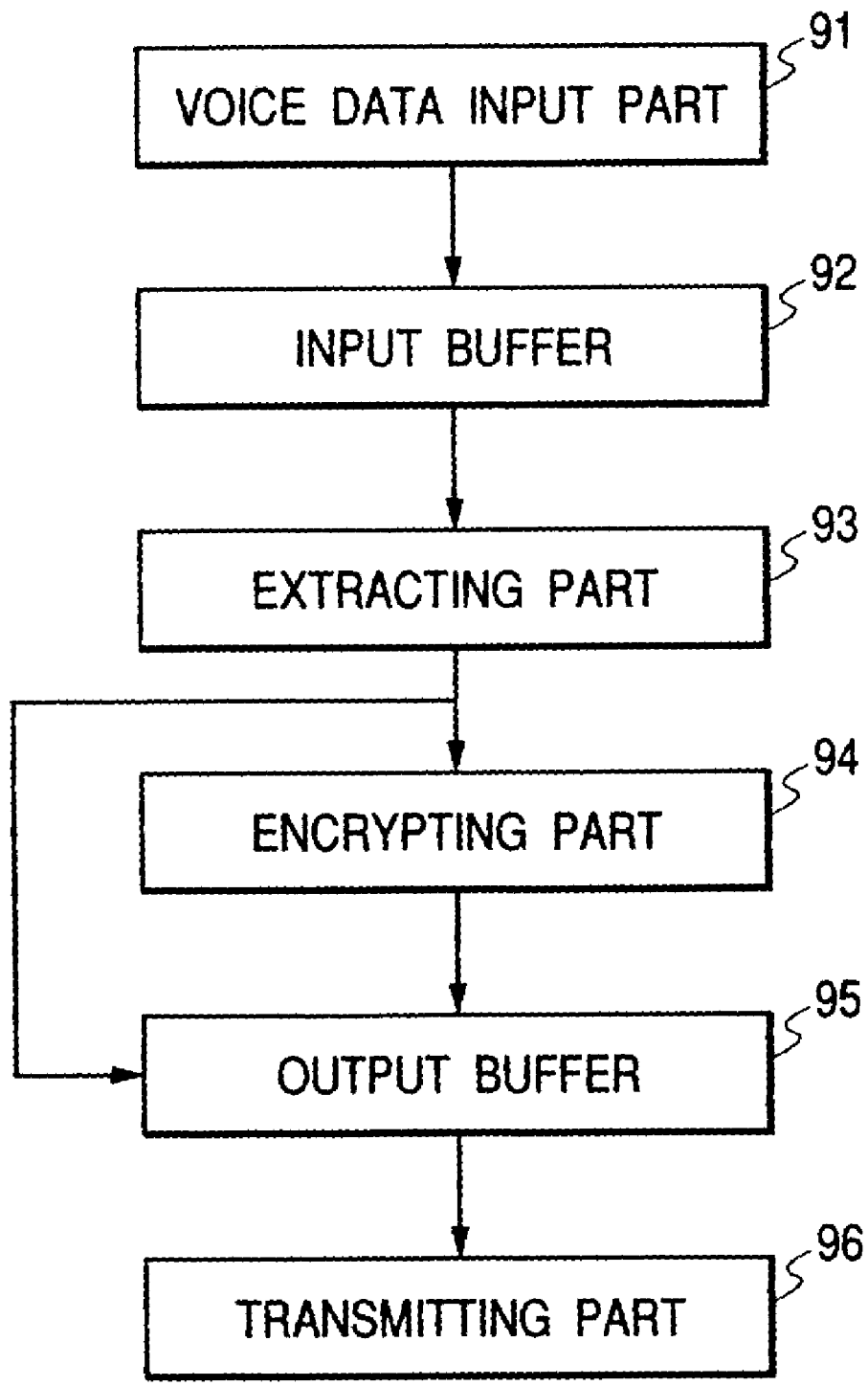
FIG. 8 is a block diagram illustrating a third embodiment of the invention.

FIG. 8 illustrates the third embodiment of the invention. In this embodiment, voice data is encrypted. It is assumed that the voice data is constituted of each sampling data of 16 bits subjected to pulse code modulation (PCM).

In FIG. 8, reference numeral 91 represents a voice data input part for inputting voice data. Reference numeral 92 represents an input buffer for tentatively storing voice data. Reference numeral 93 represents an extracting part for extracting four bits including 15th, 11th, 7th and 3rd bits from the data stored in the input buffer 92. Reference numeral 94 represents an encrypting part for encrypting the data extracted by the extracting part 93. Reference numeral 95 represents an output buffer for tentatively storing data to be transmitted. Reference numeral 96 represents a transmitting part for transmitting data in the output buffer 95.

Figure 9A:
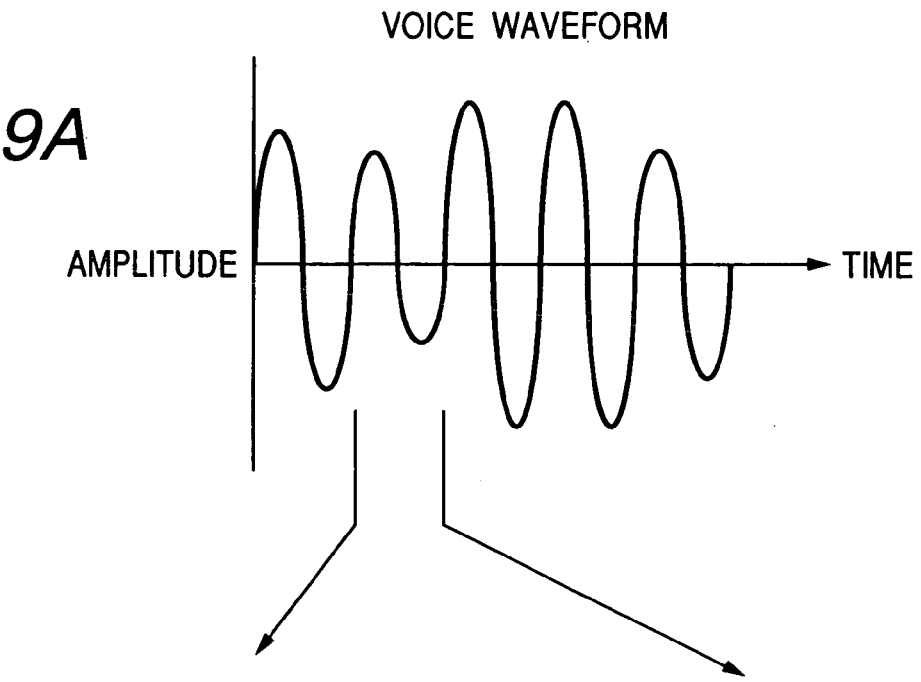
FIGS. 9A, 9B and 9C illustrate the structure of voice data according to the third embodiment of the invention.
Figure 9B:
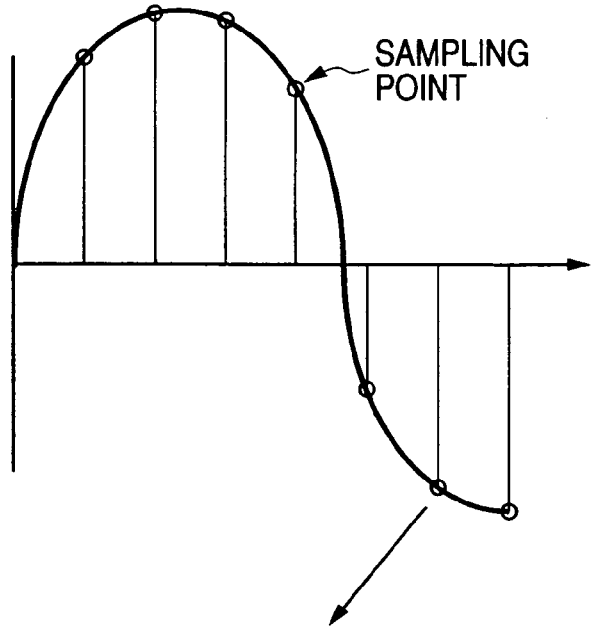
Figure 9C:
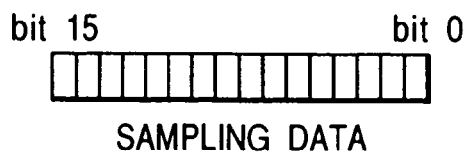

With reference to FIGS. 9A to 9C, the structure of voice data will be described. Voice data is constituted of each sampling data of 16 bits subjected to PCM as shown in FIG. 9C. Voice data having a high weight portion of voice information representation is upper bits. Therefore, if the upper bits only are encrypted, it is almost impossible to recover original correct voice information. However, voice data having a low record level has a high possibility that the upper bits thereof are not used and they may become 0. If the third party taps this voice data and the encrypted unknown bits are masked to 0, the voice data at the low record level can be easily recovered. In order to avoid this, in this embodiment, for example, a voice waveform such as shown in FIG. 9A is encrypted by extracting discrete four bits including 15th, 11th, 7th and 3rd bits from all 16 bits.

Figure 10:
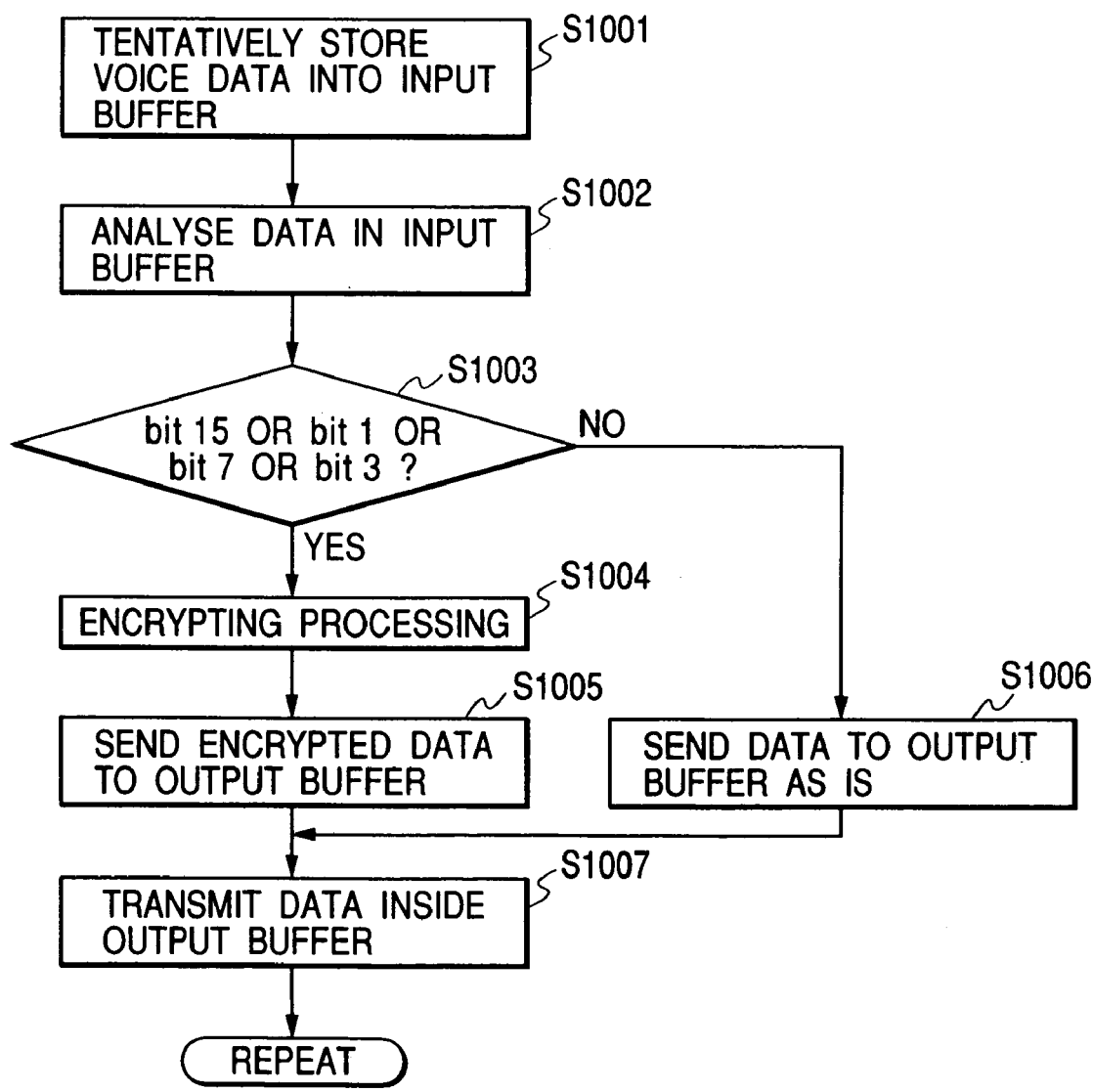
FIG. 10 is a flow chart illustrating an example of the operation according to the third embodiment of the invention.

FIG. 10 is a flow chart illustrating an example of the operation according to this embodiment. Voice data input form the input part 91 is tentatively stored in the input buffer 92 (S1001). Thereafter, the extracting part 93 analyzes the data (S1002), extracts four bits including 15th, 11th, 7th and 3rd bits (S1003), and the encrypting part 94 encrypts the four bits (S1004) and sends the encrypted bits to the output buffer 95 (S1005). The remaining 12-bit data is not encrypted but is directly sent to the output buffer 95 (S1006). Thereafter, the contents of the output buffer 95 are transmitted from the transmitting part 96 (S1007).

Fourth Embodiment

Figure 11:
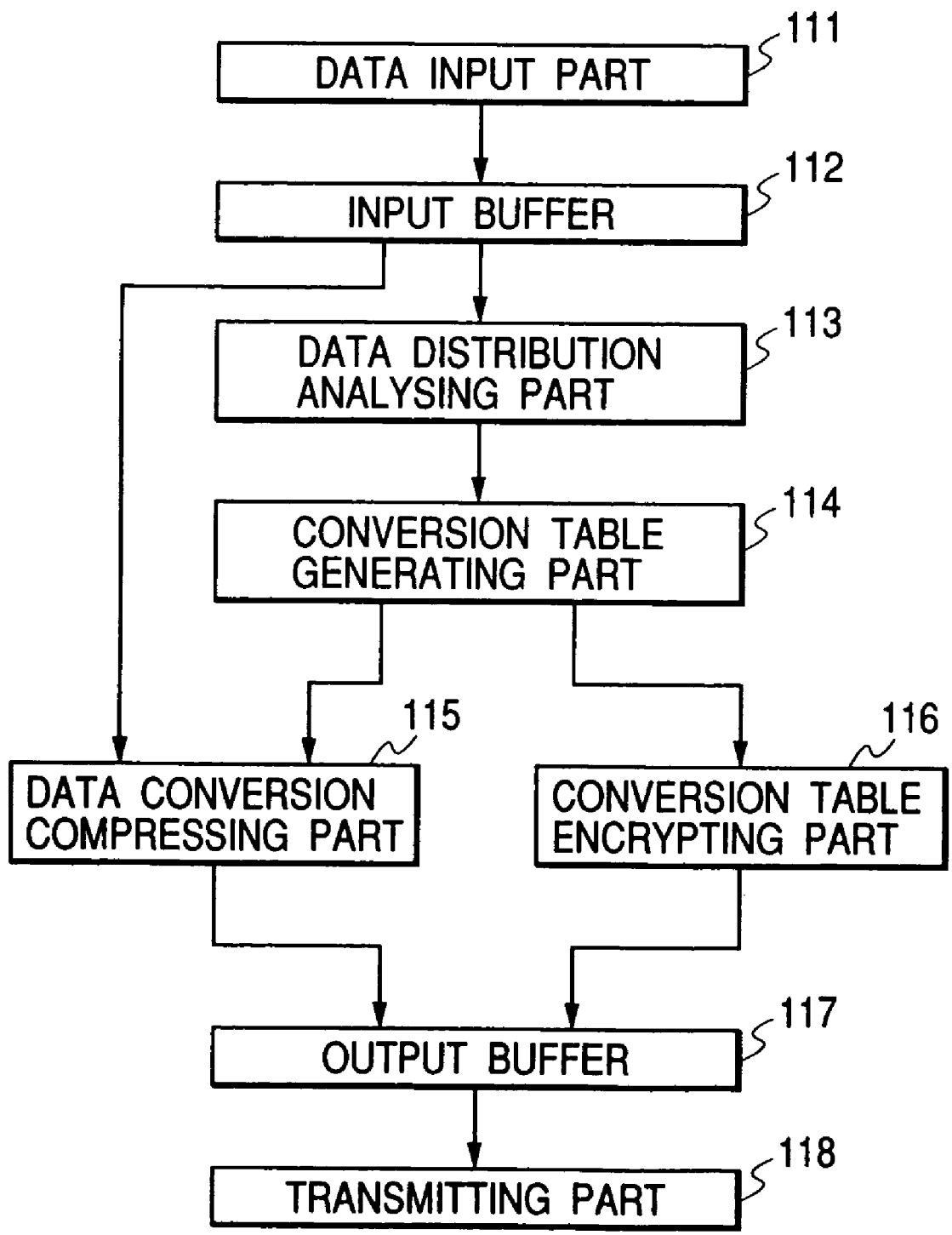
FIG. 11 is a block diagram illustrating a fourth embodiment of the invention.

FIG. 11 illustrates the fourth embodiment of the invention. In this embodiment, compressed data is encrypted. One of widely used data compression methods is to form a conversion table using Huffman codes assigned a smaller number of bits in the order from a pattern having a higher use frequency and to execute data conversion/compression by using this table. When compressed data is to be expanded, the same conversion table is used. In this embodiment, data is compressed and only the data corresponding to the conversion table is encrypted to make it difficult to recover the original data from the tapped data, thus realizing the effects equivalent to those when all the data is encrypted.

In FIG. 11, reference numeral 111 represents a data input part for inputting data. Reference numeral 112 represents an input buffer for tentatively storing input data input by data input part 111. Reference numeral 113 represents a data distribution analyzing part for analyzing the distribution of patterns used in the data stored in the input buffer 112. Reference numeral 114 represents a conversion table generating part for generating a compression conversion table in accordance with the analysis result of the data distribution analyzing part 113. Reference numeral 115 represents a data conversion compressing part for compressing input data by using the conversion table generated by the conversion table generating part 114. Reference numeral 116 represents a conversion table encrypting part for encrypting the conversion table generated by the conversion table generating part 114. Reference numeral 117 represents an output buffer for storing the compressed data generated by the data conversion compressing part 115 and the table generated by the conversion table encrypting part 116. Reference numeral 118 represents a transmitting part for transmitting the contents in the output buffer 117.

Figure 12:
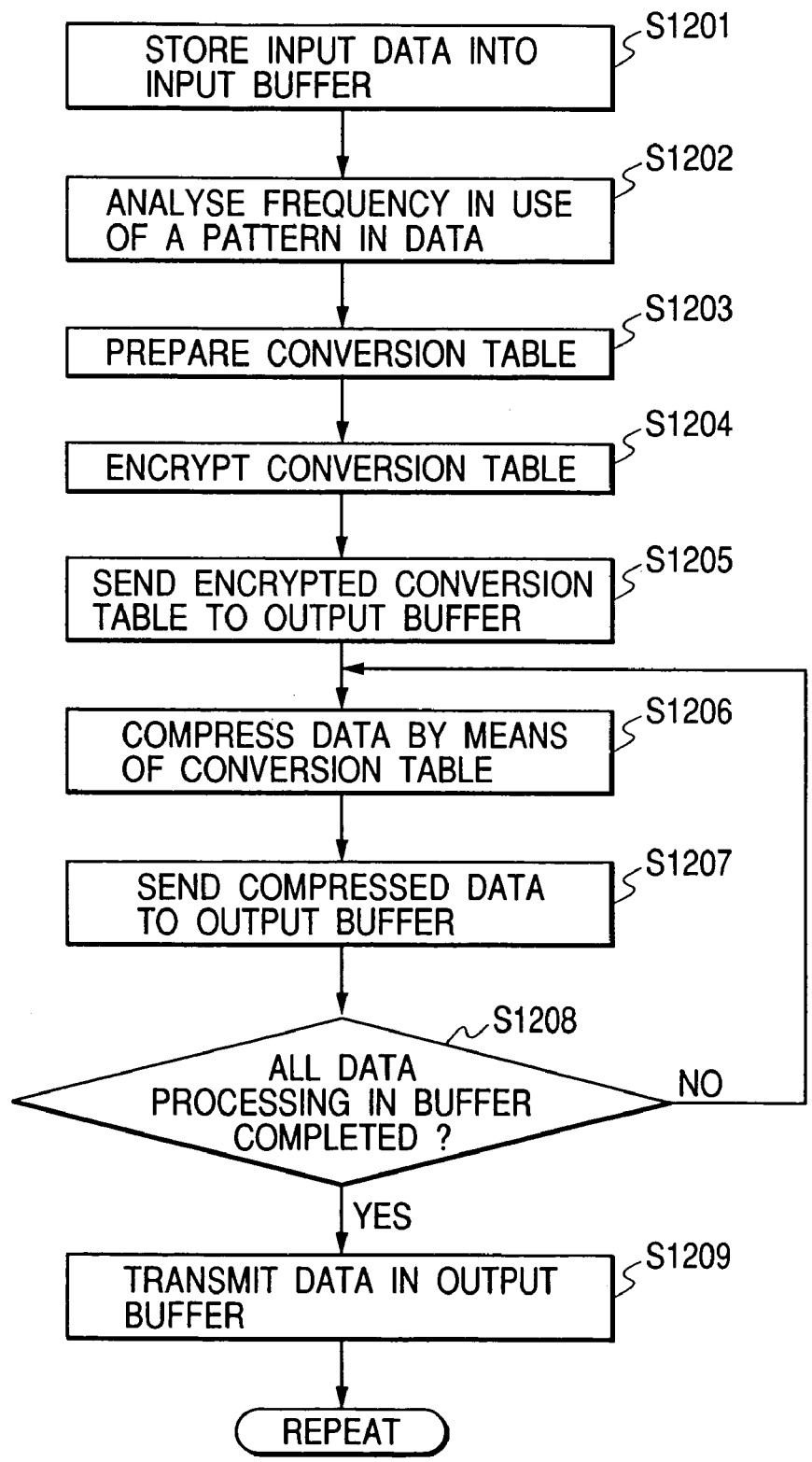
FIG. 12 is a flow chart illustrating an example of the operation according to the fourth embodiment of the invention.

FIG. 12 is a flow chart illustrating an example of the operation according to this embodiment. Data input form the input part 111 is tentatively stored in the input buffer 112 (S1201). Thereafter, the distribution of patterns in the data is analyzed by the data analyzing part 113 (S1202). In accordance with the analysis result, the compression conversion table is generated by the conversion table generating part (S1203). This conversion table is encrypted by the conversion table encrypting part 116 (S1204) and sent to the output buffer 117 (S1205). The data conversion compressing part 115 compresses the input data by using the conversion table (S1206), and the compressed data is directly supplied to the output buffer 117 without being encrypted (S1207). After all data in the output buffer 117 is processed completely (S1208), the contents of the output buffer 117 are transmitted from the transmitting part 118 (S1209).

As described above, according to the embodiments, all the communication data is not encrypted but only the important data among the communication data is encrypted to shorten the time required for the total cipher process.

The invention is applicable not only to communications between different user terminals but also to communications between a data processing apparatus such as a computer and a storage device such as a hard disk, i.e., to data read/write.

The invention is applicable to a system constituted of a plurality of apparatuses (e.g., a computer, interface units, a display and the like) or to a single apparatus, so long as the functions of each of the embodiments can be realized.

The scope of the invention includes the case wherein a system or apparatus connected to various devices which realize the functions of each of the embodiments, is supplied with software program codes realizing the functions of each embodiment and a computer (CPU or MPU) of the system or apparatus reads and executes the programs code to operate the devices. In this case, the program codes themselves stored in a storage medium realize the functions of each embodiment. Therefore, means for supplying the program codes to the computer, e.g., a storage medium storing such program codes, constitutes the present invention.

The storage medium for storing such program codes may be a floppy disk, a hard disk, an optical disk, a magnetooptical disk, a CD-ROM, a CD-R, a magnetic tape, a nonvolatile memory card, a ROM or the like.

It is obvious that the scope of the invention also contains not only the case wherein the functions of each embodiment can be realized by executing the program codes read by a computer, but also the case wherein the functions of each embodiment can be realized by an operating system (OS) running on the computer or by other application software, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU or the like of the function expansion board or function expansion unit.

If the invention is to be applied to the storage medium, this storage medium stores therein program codes corresponding to the operation described with each of the flow charts described above.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A data processing apparatus comprising:
   input means for inputting voice data encoded into a plurality of codes each having a predetermined number of bits;
   extracting means for extracting a bits at predetermined discrete positions from each of the plurality of codes input by the input means, wherein the extracting means extracts the predetermined discrete bits by sampling at a predetermined interval of bits from each code;
   encrypting means for encrypting the bits at the predetermined discrete positions of each code extracted by the extracting means without encrypting remaining bits of the code not extracted by the extracting means;
   combining means for combining the bits at the predetermined discrete positions of each code encrypted by the encrypting means with the remaining bits not encrypted by the encrypting means; and
   transmitting means for transmitting voice data in which each code is combined by the combining means.

2. A data processing method comprising:
   an input step of inputting voice data encoded into a plurality of codes each having a predetermined number of bits;
   an extracting step of extracting a bits at predetermined discrete positions from each of the plurality of codes input at the input step, wherein the extracting step extracts the predetermined discrete bits by sampling at a predetermined interval of bits from each code;
   an encrypting step of encrypting the bits at the predetermined discrete positions of each code extracted at the extracting step without encrypting remaining bits of the code not extracted at the extracting step;
   a combining step of combining the bits at the predetermined discrete positions of each code encrypted at the encrypting step with the remaining bits not encrypted at the encrypting step; and
   a transmitting step of transmitting voice data in which each code is combined at the combining step.

3. A data processing program, stored on a computer readable medium, for controlling a computer to perform data processing, said program comprising codes for causing the computer to perform:
   an input step of inputting voice data encoded into a plurality of codes each having a predetermined number of bits;
   an extracting step of extracting bits at predetermined discrete positions from each of the plurality of codes input at the input step, wherein the extracting step extracts the predetermined discrete bits by sampling at a predetermined interval of bits from each code;
   an encrypting step of encrypting the bits at the predetermined discrete positions of each code extracted at the extracting step without encrypting remaining bits of the code not extracted at the extracting step;
   a combining step of combining the bits at the predetermined discrete positions of each code encrypted at the encrypting step with the remaining bits not encrypted at the encrypting step; and
   a transmitting step of transmitting voice data in which each code is combined at the combining step.

4. A data processing apparatus comprising:
   input means for inputting image data including a plurality of pixels each having a predetermined number of bits;
   extracting means for extracting bits at predetermined bit positions from each pixel input by the input means, wherein the predetermined bit positions are a predetermined number of upper bit positions;
   extracting means for encrypting the bits at the predetermined bit positions of each pixel extracted by the extracting means without encrypting bits at remaining bit positions of the pixel not extracted by the extracting means;
   combining means for combining the bits at the predetermined bit position of each pixel encrypted by the encrypting means with the bits a the remaining bit positions of the pixel not encrypted by the encrypting means; and
   transmitting means for transmitting image data in which each pixel is combined by the combining means.

5. A data processing method comprising:
   an input step of inputting image data including a plurality of pixels each having a predetermined number of bits;
   an extracting step of extracting bits at predetermined bit positions from each pixel input at the input step, wherein the predetermined bit positions are a predetermined number of upper bit positions;
   an encrypting step of encrypting the bits at the predetermined bit positions of each pixel extracted at the extracting step without encrypting bits at remaining bit positions of the pixel not extracted at the extracting step;
   a combining step of combining the bits at the predetermined bit positions of each pixel encrypted at the encrypting step with the bits at the remaining bit position of the pixel not encrypted at the encrypting step; and
   a transmitting step of transmitting image data in which each pixel is combined at the combining step.

6. A data processing program, stored on a computer readable medium, for controlling a computer to perform data processing, said program comprising codes for causing the computer to perform:
   an extracting step of extracting bits at predetermined bit positions from each pixel input at the input step;
   an encrypting step of encrypting the bits at the predetermined bit position of each pixel extracted at the extracting step without encrypting bits at remaining bit positions of the pixel not extracted at the extracting step, wherein the predetermined bit positions are a predetermined number of upper bit positions;
   a combining step of combining the bits at the predetermined bit positions of each pixel encrypted at the encrypting step with the bits at the remaining bit positions of the pixel not encrypted at the encrypting step; and
   a transmitting step of transmitting image data in which each pixel is combined at the combining step.

* * * * *

UNITED STATES PATENT AND TRADEMARK OFFICE
CERTIFICATE OF CORRECTION

PATENT NO. : 6,959,088 B1  Page 1 of 1
APPLICATION NO. : 09/527691
DATED : October 25, 2005
INVENTOR(S) : Masahiko Yamaguchi It is certified that error appears in the above-identified patent and that said Letters Patent is hereby corrected as shown below:

Drawings,
Sheet 3, FIG. 3, "ANALYSE" should read -- ANALYZE --.
Sheet 4, FIG. 4, "ANALYSE" should read -- ANALYZE --.
Sheet 7, FIG. 7, "ANALYSE" should read -- ANALYZE --.
Sheet 10, FIG. 10, "ANALYSE" should read -- ANALYZE --.
Sheet 11, FIG. 11, "ANALYSING" should read -- ANALYZING --.
Sheet 12, FIG. 12, "ANALYSE" should read -- ANALYZE --.

Column 6,
Line 4, "form" should read -- from --.

Column 7,
Lines 10 and 29, delete "a".

Column 8,
Line 17, "a" should read -- at --.
Line 47, "step;" should read -- step, wherein the predetermined bit positions are a predetermined number of upper bit positions; --.
Line 51, "step," should read -- step. --.
Lines 52 and 53, should be deleted.

Signed and Sealed this

Twenty-seventh Day of June, 2006

JON W. DUDAS
*Director of the United States Patent and Trademark Office*